(12) United States Patent
Nam et al.

(10) Patent No.: US 10,190,786 B2
(45) Date of Patent: Jan. 29, 2019

(54) HUMIDIFYING AIR CLEANER

(71) Applicant: COWAY CO., LTD., Chungcheongnam-do (KR)

(72) Inventors: Yu-Young Nam, Seoul (KR); Hyo-Sung Kim, Seoul (KR); Chan-Jung Park, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 283 days.

(21) Appl. No.: 15/107,138

(22) PCT Filed: Nov. 24, 2014

(86) PCT No.: PCT/KR2014/011321
§ 371 (c)(1),
(2) Date: Jun. 22, 2016

(87) PCT Pub. No.: WO2015/099296
PCT Pub. Date: Jul. 2, 2015

(65) Prior Publication Data
US 2017/0045245 A1     Feb. 16, 2017

(30) Foreign Application Priority Data

Dec. 27, 2013   (KR) .................. 10-2013-0165756
Dec. 27, 2013   (KR) .................. 10-2013-0165757

(51) Int. Cl.
*B01D 51/00*     (2006.01)
*F24F 6/04*      (2006.01)
(Continued)

(52) U.S. Cl.
CPC ............ *F24F 6/04* (2013.01); *B01D 46/0035* (2013.01); *B01D 46/10* (2013.01); *F24F 3/1603* (2013.01);
(Continued)

(58) Field of Classification Search
CPC ...... F24F 6/04; F24F 13/20; F24F 6/00; F24F 3/1603; F24F 2006/008; F24F 2003/1614;
(Continued)

(56) References Cited

U.S. PATENT DOCUMENTS 2,994,405 A  *  8/1961  Barach .................... F24F 3/166
                                                          423/210
4,564,375 A  *  1/1986  Munk ................... B05B 7/0483
                                                         239/589.1
(Continued)

FOREIGN PATENT DOCUMENTS

CN          103376229         10/2013
JP           4011094           9/2007
(Continued)

OTHER PUBLICATIONS

International Search Report (and English Translation) PCT/KR2014/011321, dated Feb. 26, 2015 (4 pages).
(Continued)

*Primary Examiner* — Dung H Bui
(74) *Attorney, Agent, or Firm* — Dority & Manning, P.A.

(57) ABSTRACT

Disclosed is a humidifying air cleaner comprising: a housing having an inner space and having a barrier member for delimiting the inner space; and a humidification unit installed on the housing to be arranged on the lower portion of the barrier member, wherein the barrier member has a first air inlet, behind which the humidification unit is arranged, and which is formed such that air flows into the humidification unit, and a second air inlet formed to be arranged above the first air inlet, and the barrier member is provided with a rib for increasing the amount of air flowing through the first air inlet.

5 Claims, 4 Drawing Sheets

(51) Int. Cl.
    *B01D 46/10*         (2006.01)
    *F24F 3/16*          (2006.01)
    *F24F 6/00*          (2006.01)
    *B01D 46/00*         (2006.01)
    *F24F 13/20*         (2006.01)

(52) U.S. Cl.
    CPC ............... *F24F 6/00* (2013.01); *F24F 13/20* (2013.01); *B01D 2267/40* (2013.01); *B01D 2279/50* (2013.01); *F24F 3/166* (2013.01); *F24F 6/043* (2013.01); *F24F 2003/1614* (2013.01); *F24F 2003/1617* (2013.01); *F24F 2006/008* (2013.01)

(58) Field of Classification Search
    CPC ....... F24F 2003/1617; F24F 2001/0096; F24F 6/043; F24F 2003/1682; F24F 3/166; B01D 46/0035; B01D 2279/50; B01D 2267/40; B01D 46/10
    See application file for complete search history.

(56) References Cited

U.S. PATENT DOCUMENTS

| | | | | |
|---|---|---|---|---|
| 5,578,113 A * | 11/1996 | Glenn | ..................... | B03C 3/155 |
| | | | | 261/107 |
| 7,323,146 B2 * | 1/2008 | Kim | ..................... | A61L 9/16 |
| | | | | 422/186.06 |
| 8,034,169 B2 | 10/2011 | Yamashita et al. | | |
| 9,440,240 B2 * | 9/2016 | Mills | ..................... | B03C 3/017 |
| 2004/0118277 A1 * | 6/2004 | Kim | ..................... | B01D 46/10 |
| | | | | 95/57 |
| 2004/0118284 A1 * | 6/2004 | Kim | ..................... | B03C 3/09 |
| | | | | 96/15 |
| 2004/0129140 A1 * | 7/2004 | Park | ..................... | B01D 46/10 |
| | | | | 96/59 |
| 2009/0139408 A1 | 6/2009 | Kang | | |

FOREIGN PATENT DOCUMENTS

| | | |
|---|---|---|
| KR | 20090058446 | 6/2009 |
| KR | 20120094731 | 8/2012 |
| KR | 20120101787 | 9/2012 |
| KR | 20130024555 | 3/2013 |
| KR | 20130121726 | 11/2013 |

OTHER PUBLICATIONS

Office Action for CN Application No. 201480070199.3 dated Jan. 3, 2017, 8 pages.

* cited by examiner

A-A'

HUMIDIFYING AIR CLEANER

TECHNICAL FIELD

The present disclosure relates to a humidifying air cleaner, and more particularly, to a humidifying air cleaner that may increase the amount of air humidified by a humidifying filter while increasing air intake in a direction in which a humidifying unit is provided in a structure using a two-way suction fan.

BACKGROUND ART

In general, air cleaners may draw polluted indoor air, and may filter out dust or odor particles contained in the indoor air to purify the drawn indoor air into clean air. As such, the purified indoor air may be repeatedly discharged externally from the air cleaner.

In other words, the air cleaner may draw polluted air therearound, may purify the polluted air, and may clean the air therearound while discharging clean air.

To this end, the air cleaner may, in general, include a blower for drawing the air therearound and discharging purified air and filters for filtering out dust or odor particles contained in the drawn air. For example, the air cleaner may purify the air flowing through the filters.

Meanwhile, humidifying air cleaners among such air cleaners may use the principle of converting the air, purified by various types of filters, into humid air while passing through saturated humidifying filters.

In other words, the humidifying air cleaner may allow the purified air to contain water, thus performing an air cleaning function and a humidifying function in a dry environment.

As such, the humidifying air cleaner may allow saturated air that passes through the humidifying filter and non-saturated air that does not penetrate therethrough to meet, and may externally discharge the combined air.

However, since the flux of the air passing through the humidifying filter is small, the humidifying air cleaner might not have a sufficient degree of humidifying capability.

Accordingly, the development of a structure that may increase the amount of humidified air is required, and with an increase in the amount of humidified air, it is urgent to develop a structure that may increase the amount of air filtered by the humidifying filter.

DISCLOSURE

Technical Problem

An aspect of the present disclosure may provide a humidifying air cleaner that may increase the amount of humidified air by raising the flux of air passing through a humidifying filter.

Another aspect of the present disclosure may provide a structure that may increase the amount of air humidified by a humidifying filter while raising the amount of humidified air.

Technical Solution

According to an aspect of the present disclosure, a humidifying air cleaner may include: a housing having an internal space and including a barrier member dividing the internal space; and a humidifying unit provided in the housing to be disposed on a lower portion of the barrier member, in which the barrier member comprises a first air inlet allowing the air to flow in the humidifying unit, the humidifying unit disposed in the rear of the first air inlet, and a second air inlet disposed on an upper portion of the first air inlet, and the barrier member comprises a rib increasing the amount of air flowing in the first air inlet.

The rib may be disposed between the first air inlet and the second air inlet, and may separate the first air inlet and the second air inlet from each other.

The first air inlet may have a funnel shape, the funnel shape having a passage of which a cross section may narrow toward the inside of the first air inlet.

The barrier member may include a fan installation portion, the fan installation portion including a fan provided therein. The rib may include a circular portion disposed adjacent to the second air inlet, and an extending portion extending from the circular portion.

The humidifying unit may be attached or detached to/from the housing.

The first air inlet may include a flange to stop the humidifying filter.

The flange may be closer to the first air inlet than the humidifying filter.

The flange may include a contact protrusion protruding in a direction of the humidifying filter to contact the humidifying filter.

Advantage Effects

According to an exemplary embodiment in the present disclosure, a humidifying air cleaner may increase the amount of humidified air by raising the flux of air passing through a humidifying filter.

Further, the humidifying air cleaner may increase the amount of air filtered by the humidifying filter while raising the amount of humidified air.

BEST MODE FOR INVENTION

Figure 1:
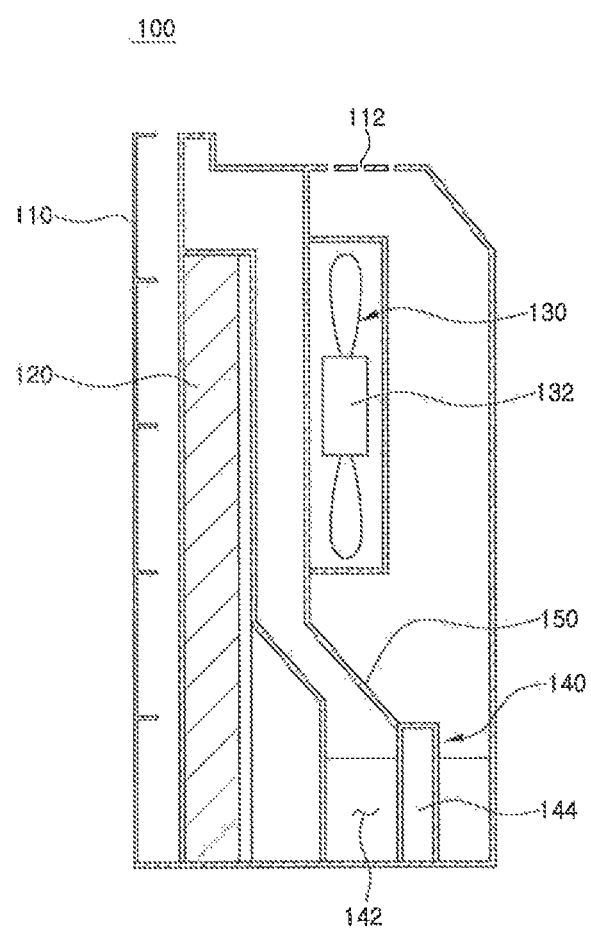
FIG. 1 is a schematic diagram illustrating a humidifying air cleaner according to an exemplary embodiment in the present disclosure.

Hereinafter, the exemplary embodiments of the present disclosure will be described in detail with reference to the attached drawings. The disclosure may, however, be exemplified in many different forms and should not be construed as being limited to the specific embodiments set forth herein. Rather, these embodiments are provided so that this disclosure will be thorough and complete, and will fully convey the scope of the invention to those skilled in the art. The shapes or sizes of components shown in the drawings are exaggerated for clarity.

Figure 2:
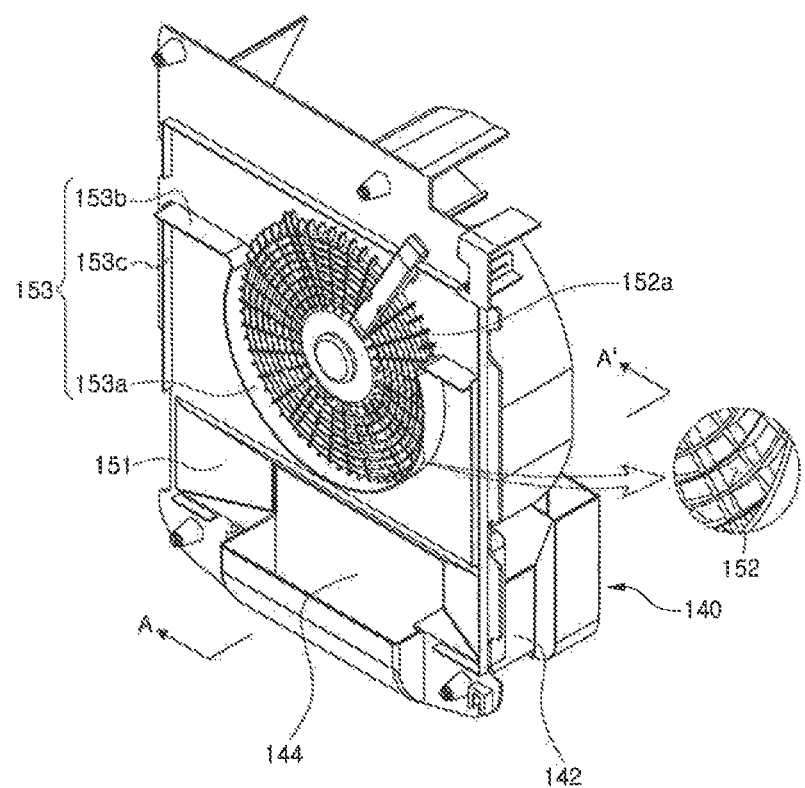
FIG. 2 is a perspective view illustrating a barrier member provided in a humidifying air cleaner according to an exemplary embodiment in the present disclosure.
Figure 3:
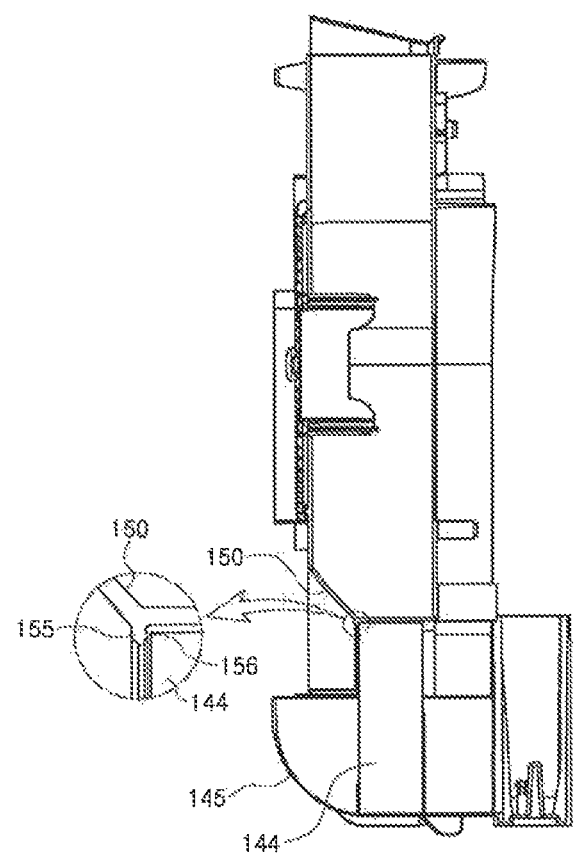
FIG. 3 is a cross-sectional view taken along line A-A' of FIG. 2, the cross-sectional view illustrating the shape of a humidifying filter provided in a humidifying air cleaner according to an exemplary embodiment in the present disclosure.
Figure 4:
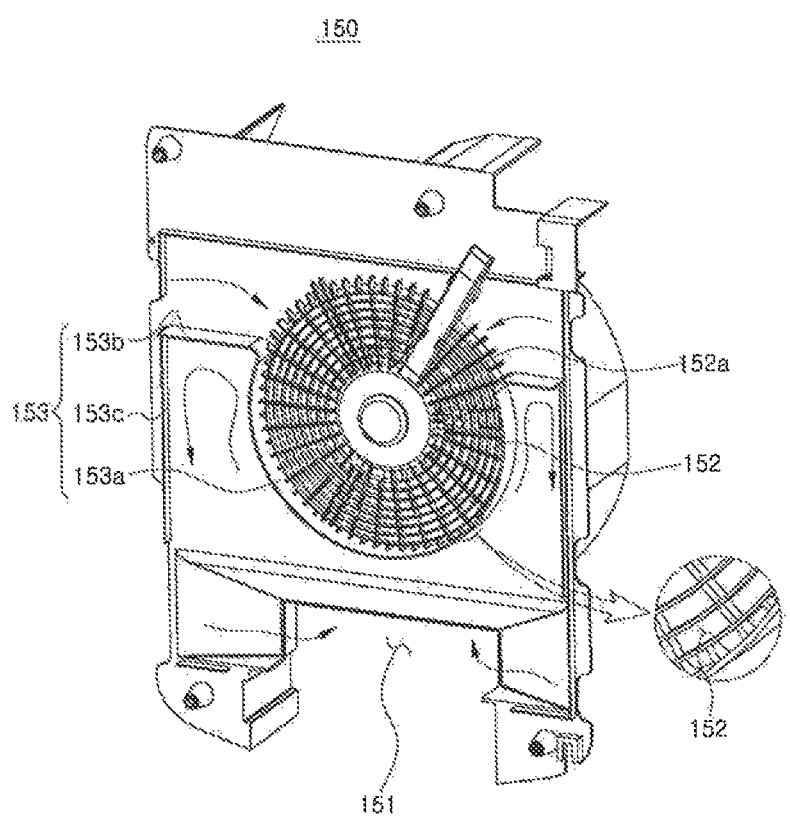
FIG. 4 is a diagram illustrating operations of a humidifying air cleaner according to an exemplary embodiment in the present disclosure.

FIG. 1 is a schematic diagram illustrating a humidifying air cleaner according to an exemplary embodiment in the present disclosure; FIG. 2 is a perspective view illustrating a barrier member provided in a humidifying air cleaner according to an exemplary embodiment in the present disclosure; FIG. 8 is a cross-sectional view taken along line A-A' of FIG. 2, illustrating the shape of a humidifying filter provided in a humidifying air cleaner according to an exemplary embodiment in the present disclosure; and FIG. 4 is a diagram illustrating operations of a humidifying air cleaner according to an exemplary embodiment in the present disclosure.

Referring to FIGS. 1 through 4, a humidifying air cleaner 100 according to an exemplary embodiment in the present disclosure may include a housing 110, a filter 120, a blower 130, a humidifying unit 140, and a barrier member 150, as an example.

The housing 110 may form the appearance of the humidifying air cleaner 100, and may have an internal space. The housing 110 may also have an inlet (not illustrated) in which the air may flow, and an outlet 112 from which a mixture of purified air and saturated air may be discharged.

In more detail, the air flowing through the inlet may be purified by the filter 120, and finally, the air passing through the humidifying unit 140 and the air not passing through the humidifying unit 140 are mixed with each other to be discharged from the housing 110 through the outlet 112.

The filter 120 may be an assembly of a plurality of filtering units providing clean air by filtering a foreign substance or dust from the air. To this end, the filter 120 may include a filter formed by combining at least two of a prefilter, a preprocessing filter, a functional filter, a HEPA filter, and a deodorizing filter.

In more detail, the filter 120 may be provided in the housing 110 to function to purify air flowing therein.

The blower 130 may be disposed in the rear of the filter 120. More specifically, the blower 130 may be disposed in a rear surface of the barrier member 150. The blower 130 may include a fan 132 provided therein to allow the air to flow in and out of the housing 110. In more detail, the blower 130 may function to allow the indoor air to flow in the housing 110, to filter the flowing air into clean air through each filter, and to discharge the clean air to an interior space.

In the present exemplary embodiment, the blower 130 may be configured by a two-way suction fan. In more detail, the fan 132 may be a two-way suction fan such, as a Sirocco fan.

The humidifying unit 140 may be provided in the housing 110 to be disposed below the fan 130. The humidifying unit 140 may also be disposed on a rear surface of the barrier member 150 like the blower 130. The humidifying unit 140 may also include a water bath 142, a humidifying filter 144, and a water container 145.

The water bath 142 may have the humidifying filter 144 provided therein, and may have a container shape in which water supplied from the water container 145 may be received. In more detail, the humidifying filter 144 may have a lower end portion thereof provided to be deposited into water received in the water bath 142 so that the air passing through the humidifying filter 144 may contain water.

Here, the humidifying filter 144 may be provided in the barrier member 150. In more detail, the humidifying filter 144 may be disposed in the inside of a first air inlet 151 provided in the barrier member 150 to be substantially vertical to a direction in which the air may flow in the first air inlet 151.

Meanwhile, the humidifying air cleaner according to the exemplary embodiment in the present disclosure will be described below, and the humidifying air cleaner may increase the amount of humidified air by raising the amount of air flowing in the first air inlet 151. To achieve such a structure, the amount of air humidified by the humidifying filter 144 may also need to be increased.

Meanwhile, the barrier member 150 having the first, air inlet 151 may include a flange 155 on which the humidifying filter 144 may be caught. The flange 155 may be positioned on the first air inlet 151 in a direction in which the air may flow, rather than the humidifying filter 144.

The flange 155 may also include a contact protrusion 155 provided thereon to protrude in a direction of the humidifying filter 144 to contact the humidifying filter 144.

As such, when the housing 110—more specifically, the barrier member 150—includes the flange 155 and the contact protrusion 156, the flange 155 substantially vertically provided based on an air flowing direction may significantly reduce the amount of the air passing through a space between the humidifying filter 144 and the housing 110—more specifically, a space between barrier members 150. In more detail, the flange 155 may lead the flow of the air passing through the space between the humidifying filter 144 and the housing 110—more specifically, the space between the barrier members 150—in a direction of a main body of the humidifying filter 144, thereby increasing humidifying efficiency.

The housing 110 may include the barrier member 150 to divide the internal space. The barrier member 150 may be provided in the housing 110 to divide the internal space of the housing 110. In more detail, the barrier member 150 may be provided to separate a space in which the filter 120 may be provided from that in which the blower 130 and the humidifying unit 140 may be provided.

Meanwhile, the barrier member 150 may include the first air inlet 151 allowing for the air to flow in the humidifying unit 140, the humidifying unit 140 disposed in the rear of the first air inlet 151, and a second air inlet 152 disposed on the upper portion of the first air inlet 151.

In more detail, the air purified by passing through the filter 120 may flow in the humidifying unit 140 through the first air inlet 151, and flow in the blower 130 through the second air inlet 152, The air passing through the second air inlet 152 and the air passing through the humidifying unit 140 may meet each other in the rear of the barrier member 150 to be externally discharged. Here, the fan 132 of the blower 130 may be composed of a two-way suction fan such as a Sirocco fan. Therefore, the second air inlet 152 may be disposed in front of the fan 132 to allow the air, drawn to directly pass through the fan 132, to flow in the second air inlet 152. The first air inlet 151 may be disposed below the fan 132 to communicate with the rear of the fan 132 so that the air drawn to the rear of the fan 132 may flow in the first air inlet 151.

In addition, the second air inlet 152 may have an enclosure 152a formed therein.

The barrier member 150 may have a rib 153 increasing the amount of air flowing to the first air inlet 151. The rib 153 may be disposed between the first air inlet 151 and the second air inlet 152 to separate the first air inlet 151 and the second air inlet 152 from each other.

To this end, the rib 153 may include a circular portion 153a disposed adjacent to the second air inlet 152, an extending portion 153b extending from the circular portion 153a in a horizontal direction, and a vertical portion 153c extending downwardly from an end of the extending portion 153b.

In more detail, the rib 153 may function to allow the air, passing through an upper end of the filter 120 of the air purified by penetrating through the filter 120, to pass through the barrier member 150 through the second air inlet 152, and to allow the air passing through a lower end of the filter 120 of the purified air to penetrate through the barrier member 150 through the first air inlet 151. In order to reduce the amount of the air purified by passing through the lower end of the filter 120 flowing to the second air inlet 152, the rib 153 may be disposed around the second air inlet 152 to separate the first air inlet 151 and the second air inlet 152 from each other.

As such, the rib 153 may reduce the amount of which the air flowing to a lower portion of the rib 153 of the air purified by passing through the filter 120 via the rib 153 and flowing to the second air inlet 152.

Namely, the flux of the air flowing to the first air inlet 151 may be increased, as compared to the case in which the barrier member 150 with no rib 153 may be provided in the housing 110.

In other words, the rib 153 may be provided in the barrier member 150 to surround the second air inlet 152 in a direction of the first air inlet 151 between the first air inlet 151 and the second air inlet 152 to function to reduce the amount of the air flowing to the second air inlet 152, thus increasing the amount of the air to the first air inlet 151.

Meanwhile, the first air inlet 151 may be provided to have a passage of which a cross section may narrow toward the inside of the first air inlet 151. That is, the first air inlet 151 may have a funnel shape. As such, since the first air inlet 151 has the funnel shape, the first air inlet 151 may allow the air to flow in the humidifying filter 144 of the humidifying unit 140 to increase the flux of the flowing air, thus raising the amount of the humidified air.

As described above, the rib 153 may increase the flux of the air flowing to the first air inlet 151, thereby raising the amount of the humidified air.

Furthermore, the first air inlet 151 having the funnel shape may increase the flux of the air passing through the humidifying filter 144, thereby raising the amount of the humidified air.

While exemplary embodiments have been shown and described above, it will be apparent to those skilled in the art that modifications and variations could be made without departing from the scope of the present disclosure as defined by the appended claims.

The invention claimed is:
1. A humidifying air cleaner comprising:
a housing having an internal space and having a barrier member dividing the internal space; and a filter disposed at the front of the barrier member;
a humidifying unit provided in the housing to be disposed on a lower portion of the barrier member; and
a blower disposed on a rear surface of the barrier member and configured by a two-way suction fan,
wherein the barrier member comprises a first air inlet allowing the air to flow in the humidifying unit, the humidifying unit disposed in the rear of the first air inlet, and a second air inlet disposed on an upper portion of the first air inlet,
the barrier member comprises a rib increasing the amount of air flowing to the first air inlet,
the rib comprises a circular portion disposed adjacent to the second air inlet, and an extending portion extending from the circular portion, and
an inner space formed by the barrier member and the filter unit includes a lower portion through which the air is introduced into the first air inlet by the circular portion of the rib and the extending portion of the rib, and an upper portion through which the air is introduced into the second air inlet wherein the rib is disposed between the first air inlet and the second air inlet, and separates the first air inlet and the second air inlet from each other; wherein the first air inlet has a funnel shape, the funnel shape having a passage of a cross section narrowing toward the inside of the first air inlet; and wherein the first air inlet comprises a flange to stop a humidifying filter of the humidifying unit.
2. The humidifying air cleaner of claim 1, wherein the barrier member comprises a fan installation portion having a fan.
3. The humidifying air cleaner of claim 1, wherein the humidifying unit is attached or detached to/from the housing.
4. The humidifying air cleaner of claim 1, wherein the flange is closer to the first air inlet than the humidifying filter.
5. The humidifying air cleaner of claim 4, the flange comprises a contact protrusion protruding in a direction of the humidifying filter to contact the humidifying filter.

* * * * *